(12) United States Patent
Shaikh

(10) Patent No.: US 8,818,327 B2
(45) Date of Patent: Aug. 26, 2014

(54) COMMUNICATING A SUBSCRIBER'S STATUS USING AN INTERFACE

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 333 days.

(21) Appl. No.: 13/430,910

(22) Filed: Mar. 27, 2012

(65) Prior Publication Data

US 2013/0260711 A1    Oct. 3, 2013

(51) Int. Cl.
*H04M 11/00* (2006.01)

(52) U.S. Cl.
USPC .......................................... 455/405; 709/226

(58) Field of Classification Search
CPC .................................. H04W 4/24; H04W 4/26
USPC .......................................... 455/405; 709/226
See application file for complete search history.

(56) References Cited

U.S. PATENT DOCUMENTS

| | | | |
|---|---|---|---|
| 2004/0152442 A1* | 8/2004 | Taisto et al. | 455/406 |
| 2006/0047814 A1* | 3/2006 | Batz et al. | 709/226 |
| 2006/0090076 A1* | 4/2006 | De Cnodder et al. | 713/182 |
| 2006/0276170 A1* | 12/2006 | Radhakrishnan et al. | 455/405 |
| 2011/0086610 A1* | 4/2011 | Baldwin et al. | 455/405 |

* cited by examiner

*Primary Examiner* — Amancio Gonzalez

(57) ABSTRACT

A system may be provided that includes one or more servers to: set an availability status setting on an account, associated with a subscriber; receive a quota usage signal via a dedicated direct signaling interface, the quota usage signal indicating that a voice call minutes quota or a data usage quota is exhausted; and change the availability status setting on the account to unavailable for voice calls if the voice call minutes quota is exhausted; and/or change the availability status setting on the account to unavailable for data communications if the data usage quota is exhausted.

20 Claims, 6 Drawing Sheets

US 8,818,327 B2

COMMUNICATING A SUBSCRIBER'S STATUS USING AN INTERFACE

BACKGROUND

Internet Protocol (IP) Multimedia System (IMS) networks can provide Voice over IP (VoIP) and video services over a fourth generation (4G) wireless network. A 4G wireless network is an Internet protocol (IP) wireless access network in which different advanced multimedia application services (e.g., voice over IP (VoIP) content, video content, etc.) are delivered over IP. Some service providers separate their IMS elements, as well as voice and video services, into an IMS core site, which has no access to the Internet.

The IMS core site can include IMS elements, such as a Presence Server (PS) and an Offline Charging Server (OCS). The PS can be responsible for tracking devices' presence once the devices perform an IMS registration. The presence and availability of any particular device can be shared with other devices, which have subscribed to receiving presence and availability information. The OCS can be responsible for receiving offline billing records, as well as tracking subscribers' voice and data usage information.

DETAILED DESCRIPTION OF PREFERRED EMBODIMENTS

Figure 1A:
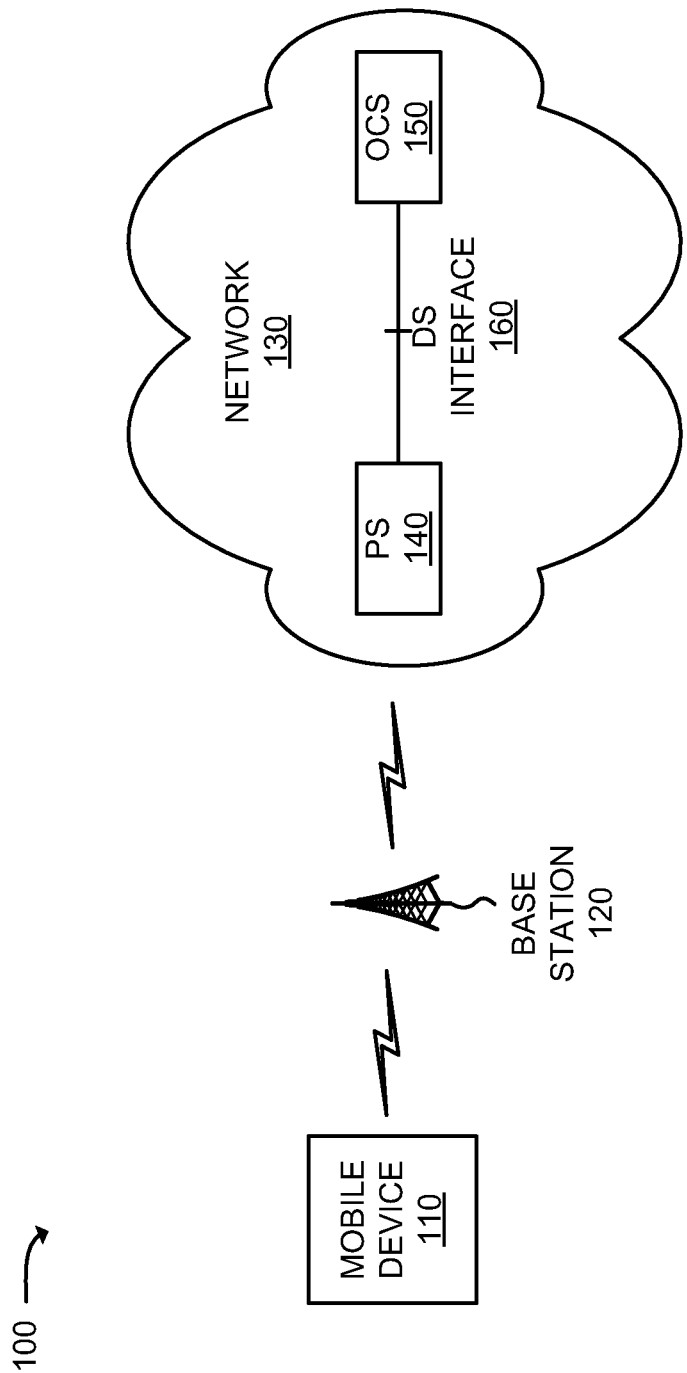
FIGS. 1A and 1B are diagrams illustrating an example environment in which systems or methods, described herein, may be implemented.

The following detailed description refers to the accompanying drawings. The same reference numbers in different drawings may identify the same or similar elements.

A system or method, described herein, may provide a Presence Server (PS), which can notify subscribers of other subscribers' status (e.g., availability for communication), an Offline Charging Server (OCS), which can monitor subscribers' voice and data usage quotas and actual usage, and a direct signaling interface (DS interface) between the OCS and the PS to allow changes in a subscriber's status to be communicated to the PS, so that the PS can change the subscribers' status, and thereby, prevent the unnecessary use of network resources.

As used herein, Minutes of Use (MoU) is intended to include a number of voice call minutes allotted over a time period for a subscriber, and data quota is intended to include the amount of data usage allotted over a time period for a subscriber. The data quota, as used herein, can include the quota for data usage, which can include instant messaging, text messaging, video calling, web surfing, etc., which can be provided through using the data quota.

As also used herein, exhausting the MoU or the data quota is intended to include when the amount of voice call minutes or data usage meets or exceeds the MoU or the data quota for a certain time period. Exhausting the MoU or the data quota would also include instances when the MoU or data quota have been decreased. For example, the MoU or the data quota could be decreased by closing the subscriber's account, changing or removing a service (e.g., removing the MoU or the data quota from the subscriber's account), suspending the subscriber's account, etc.

In one implementation described herein, if a subscriber's MoU or data quota has been exhausted, then the OCS can send a signal to the PS via the DS interface that voice calls or data usage are not allowed, and the PS can mark the subscriber's status as unavailable. Additionally, the OCS signaling to the PS via the DS interface can request that the PS set the subscriber's status to unavailable, which can change any subscriber's set status (e.g., a subscriber may set the subscriber's status to available, but the OCS signaling to the PS can change and set the subscriber's status to unavailable). For example, if the data usage is utilized and the MoU is not, then the PS (from the OCS signal) can mark the subscriber's data usage status as unavailable (e.g., data usage would be unavailable to and from the subscriber) and the PS can continue to allow the subscriber to control their status regarding voice calls (e.g., the subscriber can set their voice call availability to available or unavailable). The OCS signaling can also be set to not allow the subscriber to change the subscriber's status while the status is set by the PS as requested by the OCS.

By setting the subscriber's status to unavailable (e.g., from a signal from the OCS to the PS via the DS interface), unnecessary calls can be reduced because the calls to and from the certain subscribers, whose voice call minutes quota or data quota have been exhausted, can be eliminated.

FIG. 1A is a diagram illustrating an example environment 100 in which systems or methods, described herein, may be implemented. As shown in FIG. 1A, example environment 100 can include mobile device 110, base station 120, network 130, PS 140, OCS 150, and DS interface 160. A single mobile device 110, base station 120, network 130, PS 140, OCS 150, and DS interface 160 have been illustrated in FIG. 1A for simplicity. In practice, there may be additional mobile devices 110, base stations 120, networks 130, PSs 140, OCSs 150, and DS interfaces 160.

Mobile device 110 may include any device capable of communicating via a network. Mobile device 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a tablet computer, a laptop computer, a personal computer, or other types of computation or communication devices.

Base station 120 may include one or more computation or communication devices that receive voice or data and transmit that voice or data to mobile device 110. Base station 120 may also receive voice or data transmitted from mobile device 110. In one implementation, base station 120 may utilize 3GPP Long Term Evolution (LTE) standards operating in a 700 MHz frequency band (e.g., base station 120 may be a base station in an LTE network). In the context of an LTE network, base station 120 may also be referred to as an eNodeB or eNB. Base station 120 may provide a radio interface for network 130. Base station 120 may combine the functionalities of a base station and a radio network controller (RNC) in 2G or 3G radio access networks.

Network 130 may include a network that provides connectivity to base station 120, PS 140, OCS 150, and DS interface 160. Network 130 may include a local area network (LAN), a wide area network (WAN), a metropolitan area network (MAN), other types of networks, or a combination of networks.

In one implementation, network 130 may take the form of an Internet Protocol (IP) Multimedia System (IMS) network, as further discussed below with FIG. 1B, that can include PS 140, OCS 150, and DS interface 160. Additionally, or alternatively, network 130 may take the form of an LTE network. An LTE network is sometimes referred to as an evolved universal terrestrial radio access network (E-UTRAN).

In another implementation, other networks, such as a network that provides a wireless (radio) interface to mobile device 110 using the 3rd generation (3G) mobile telecommunications standards, other 4th generation (4G) mobile telecommunications standards different from an LTE network, or future networks, such as a 5th generation (5G) network, may be used. 4G networks can include, in addition to or as an alternative to an LTE network, other radio access networks, such as an enhanced high rate packet data (eHRPD) network, or a wireless core network (e.g., referred to as an evolved packet core (EPC) network). An EPC network can be an all-internet protocol (IP) packet-switched core network that supports high-speed wireless and wireline broadband access technologies. An evolved packet system (EPS) is defined to include an LTE (or eHRPD) network and an EPC network.

In one implementation, PS 140, OCS 150, and DS interface 160 can be provided in an IMS network. In an IMS network, IMS-based voice calls can be allowed or denied based on a subscriber's status kept at PS 140. IMS-based voice calls can be placed without authorization or other signaling from OCS 150, so DS interface 160 can provide signaling from OCS 150 to PS 140, and PS 140 can change the subscriber's status kept at PS 140 to terminate or limit voice calls over the IMS network based on the subscriber's status as determined by PS 140 via OCS 150.

PS 140 may include a server device connected to network 130 that tracks devices' presence once the devices register with network 130. PS 140 can monitor the presence and availability of any mobile device 110 on network 130. PS 140 can also share the status of mobile device 110 regarding its presence and availability to other devices, such as other mobile devices 110, computing devices, servers, etc., on network 130.

In one implementation, PS 140 can allow a subscriber to change their status. For example, a subscriber can indicate that the subscriber is available, busy, or unavailable, and PS 140 can share the status of the subscriber's mobile device 110 with other subscribers on network 130. In one implementation, PS 140 can allow a subscriber to create a list of colleagues, and the subscriber can follow the status changes of the colleagues on the list. For example, PS 140 can notify the subscriber when a colleague on the subscriber's list becomes available or unavailable. In one implementation, PS 140 can be limited to a particular service provider.

OCS 150 may include a server device connected to network 130 that can receive offline billing records, as well as real-time or delayed billing information, voice usage information, or data usage information for one or more subscribers. Voice usage information can be based on IMS audio telephone-based services. Data usage information can be based on non-voice services, such as IMS video or general data content that a subscriber can access on the Internet. For voice and data services, each subscriber can be given a MoU or data quota for consumption during a given billing cycle (e.g., a monthly billing cycle).

The MoU can be monitored at a Telephony Application Server (TAS) and the data usage can be monitored at a Packet Data Network (PDN) Gateway (PGW). MoU quota information and data quota information can be kept at OCS 150. During a voice call or a data session, TAS and PGW, respectively, can verify that a subscriber has quota remaining for the voice call or the data session. If the MoU or the data quota has been exhausted, OCS 150 can send a message to the subscriber that the subscriber's allotted monthly quota has been exhausted and additional charges will apply for further usage. OCS 150 can also send messages at benchmarks of quota usage, such as 90%. Subscribers can choose their own messages or benchmarks for notification.

In one implementation, subscribers can be allowed to apply usage controls to their accounts. For example, when a subscriber's voice or data quota is exhausted, the subscriber's voice calls or data sessions can be terminated to avoid additional charges. OCS 150 can send a signal to TAS or PGW to terminate, limit, and/or prevent the subscriber's voice calls or data sessions.

In one implementation, OCS 150 can send a signal to PS 140 via DS interface 160 when new voice or data usage quota is available. For example, at the beginning of the next billing cycle, OCS 150 can send a signal to PS 140 via DS interface 160 to remove the PS's status setting of unavailable based on the previous OCS 150 request. The status setting, after the PS's status setting is removed, can return to the subscriber's previously set availability status.

DS interface 160 may include a network device or signal relay connected to network 130 that can carry signaling from OCS 150 to PS 140. DS interface 160 can inform PS 140 when a particular subscriber has exceeded the voice or data usage quota, and can request that PS 140 mark the particular subscriber's account or device as unavailable. DS interface 160 can inform OCS 150 that PS 140 has marked the particular subscriber's account or device as unavailable.

Figure 1B:
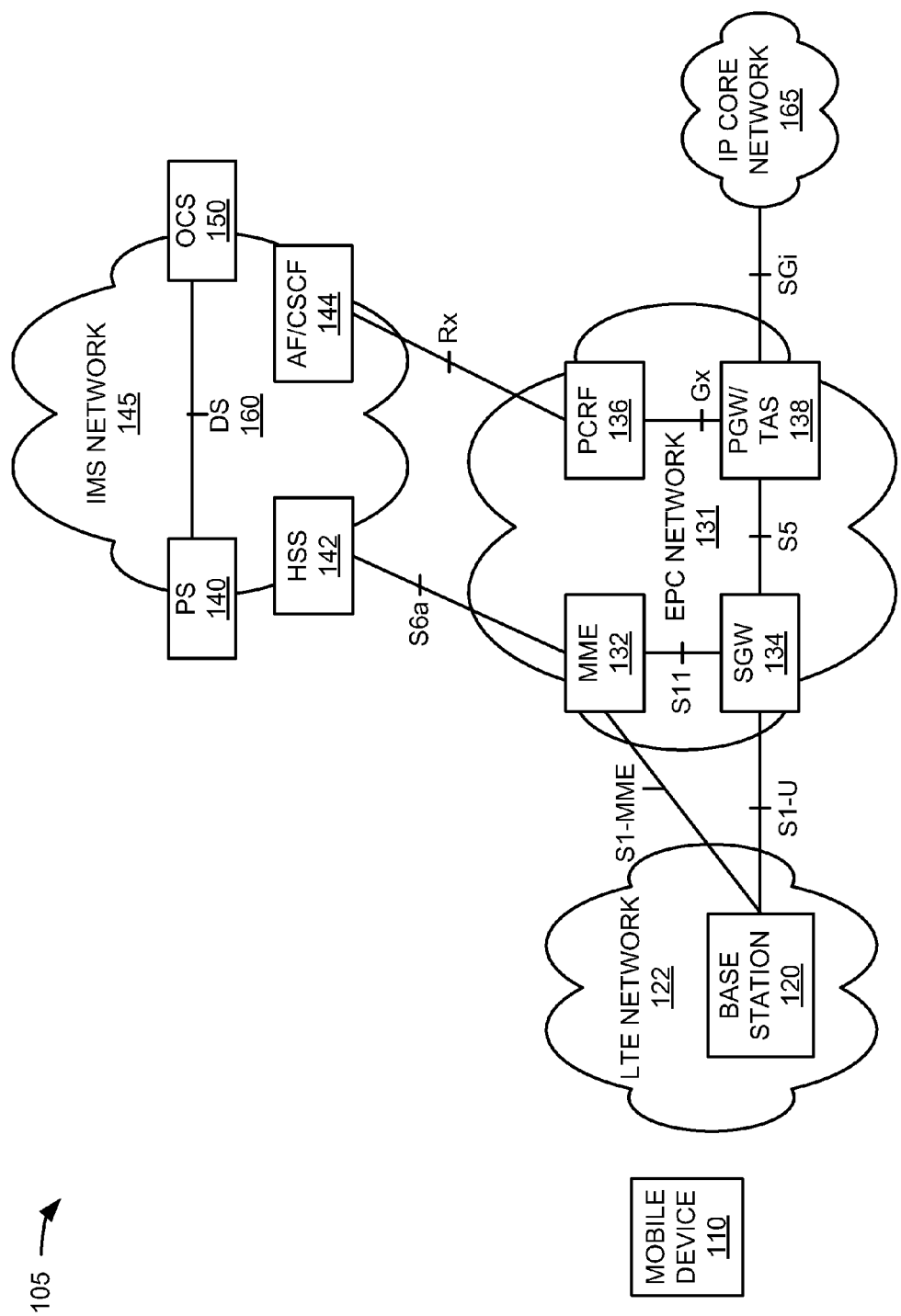

FIG. 1B is a diagram of an example network 105 in which systems or methods described herein may be implemented. As illustrated, network 105 may correspond to an Evolved Packet System (EPS) that includes mobile device 110, LTE network 122, Evolved Packet Core (EPC) network 131, IMS network 145, and IP core network 165. LTE network 122 may include base station 120. EPC network 131 may include Mobility Management Entity (MME) 132, Serving Gateway (SGW) 134, Policy and Charging Rule Function (PCRF) 136, and PGW/TAS 138. IMS network 145 may include PS 140, OCS 150, DS interface 160, Home Subscriber Server (HSS) 142, and Application Function/Call Session Control Function (AF/CSCF) 144. Devices/networks of network 105 may interconnect via wired and/or wireless connections.

A single mobile device 110, LTE network 122, base station 120, EPC network 131, MME 132, SGW 134, PCRF 136, PGW/TAS 138, PS 140, HSS 142, AF/CSCF 144, IMS network 145, OCS 150, DS interface 160, and IP core network 165 have been illustrated in FIG. 1B for simplicity. In practice, there may be additional mobile devices 110, base stations 120, LTE networks 122, EPC networks 131, MMEs 132, SGWs 134, PCRFs 136, PGW/TASs 138, PSs 140, HSSs 142, AF/CSCFs 144, IMS networks 145, OCSs 150, DS interfaces 160, or IP core networks 165. Also, in some instances, one or more of the components of network 105 may perform one or more functions described as being performed by another one or more of the components of network 105.

As further shown in FIG. 1B, base station 120 may interface with MME 132 over an interface, such as a S1-MME interface, and may interface with SGW 134 over an interface, such as a S1-U interface. MME 132 may interface with SGW 134 over an interface, such as a S11 interface, and may interface with HSS 142 over an interface, such as a S6a interface. SGW 134 may interface with PGW/TAS 138 over an interface, such as a S5 interface. PCRF 136 may interface with PGW/TAS 138 over an interface, such as a Gx interface, and may interface with AF/CSCF 144 over an interface, such as an Rx interface. PGW/TAS 138 may interface with IP core network 165 over an interface, such as a SGi interface. PS 140 may interface with OCS 150 over DS interface 160.

LTE network 122 may include a communications network that connects subscribers (e.g., mobile device 110) to a service provider. In one example, LTE network 122 may include a WiFi network or another access network (e.g., an E-UTRAN or an enhanced high-rate packet data (eHRPD) network). In another example, LTE network 122 may include a radio access network capable of supporting high data rate, low latency, packet optimization, large capacity and coverage, etc.

EPC network 131 may include a core network architecture of the 3GPP LTE wireless communication standard. In one example, EPC network 131 may include an all-IP packet-switched core network that supports high-speed wireless and wireline broadband access technologies. In another example, EPC network 131 may provide packet-switched voice services (e.g., which are traditionally circuit-switched) using IMS network 145.

MME 132 may include one or more computation or communication devices that may be responsible for idle mode tracking and paging procedures (e.g., including retransmissions) for mobile device 110. MME 132 may be involved in a bearer activation/deactivation process (e.g., for mobile device 110) and may choose SGW 134 for mobile device 110 at an initial attachment and at a time of intra-LTE handover.

MME 132 may authenticate mobile device 110 (e.g., via interaction with HSS 142). Non-access stratum (NAS) signaling may terminate at MME 132 and MME 132 may generate and allocate temporary identities to mobile devices (e.g., mobile device 110). MME 132 may check authorization of mobile device 110 to use a service provider's Public Land Mobile Network (PLMN) and may enforce roaming restrictions for mobile device 110.

MME 132 may be a termination point in EPC network 131 for ciphering/integrity protection for NAS signaling and may handle security key management. MME 132 may provide a control plane function for mobility between LTE network 122 and access networks with a S3 interface terminating at MME 132. MME 132 may also terminate a S6a interface towards HSS 142 for roaming mobile devices 110.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes or transfers data. In one implementation, SGW 134 may route and forward user data packets, may act as a mobility anchor for a user plane during inter-base station handovers, and may act as an anchor for mobility between LTE network 122 and other 3GPP technologies. For idle state mobile devices, SGW 134 may terminate a downlink (DL) data path and may trigger paging when DL data arrives for mobile device 110. SGW 134 may manage and store contexts associated with mobile device 110 (e.g., parameters of an IP bearer service, network internal routing information, etc.).

PCRF 136 may include one or more computation or communication devices that may provide policy control decision and flow based charging control functionalities. PCRF 136 may provide network control regarding service data flow detection, gating, QoS (Quality of Service) and flow based charging, etc. PCRF 136 may also store subscriber information, such as voice call and data rate plans or quotas for subscribers.

PGW/TAS 138 may include a PGW, a TAS, or both a PGW and a TAS, and may be used to monitor data usage, MoU, or both. PGW/TAS 138 can include one or more data transfer devices (or network devices), such as a gateway, a router, a switch, a firewall, a NIC, a hub, a bridge, a proxy server, an OADM, or some other type of device that processes or transfers data. In one implementation, PGW/TAS 138 may provide connectivity of mobile device 110 to external packet data networks (e.g., to IP core network 165) by being a traffic exit/entry point for mobile device 110. PGW/TAS 138 may perform policy enforcement, packet filtering for each subscriber, charging support, lawful intercept, and/or packet screening. PGW/TAS 138 may also act as an anchor for mobility between 3GPP and non-3GPP technologies.

IMS network 145 may include an architectural framework or network (e.g., a telecommunications network) for delivering IP multimedia services.

HSS 142 may include one or more computation or communication devices that gather, process, search, or provide information in a manner described herein. In one example implementation, HSS 142 may include a master subscriber database that supports devices of IMS network 145 that handle calls. HSS 142 may contain subscription-related information (e.g., subscriber profiles), may perform authentication and authorization of a subscriber, and may provide information about a subscriber's location and IP information.

AF/CSCF 144 may include one or more computation or communication devices that gather, process, search, or provide information in a manner described herein. In one implementation, AF/CSCF 144 may interact or intervene with applications that require dynamic policy and charging control. AF/CSCF 144 may extract session information and may provide the session information to PCRF 136 (e.g., over the Rx interface). For example, AF/CSCF 144 may be a central component for signaling and control within IMS network 145. AF/CSCF 144 may be responsible for signaling via session initiation protocol (SIP) between the transport plane, control plane, and application plane of IMS network 145.

IP core network 165 may include one or more IP-based networks (e.g., a local area network (LAN), a wide area network (WAN), a metropolitan area network (MAN), the Internet, etc.) capable of communicating with mobile device 110.

Although FIG. 1B shows example devices/networks of network 105, in other implementations, network 105 may contain fewer devices/networks, different devices/networks, differently arranged devices/networks, or additional devices/networks than depicted in FIG. 1B. Alternatively, or additionally, one or more devices/networks of network 105 may perform one or more other tasks described as being performed by one or more other devices/networks of network 105.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Figure 2:
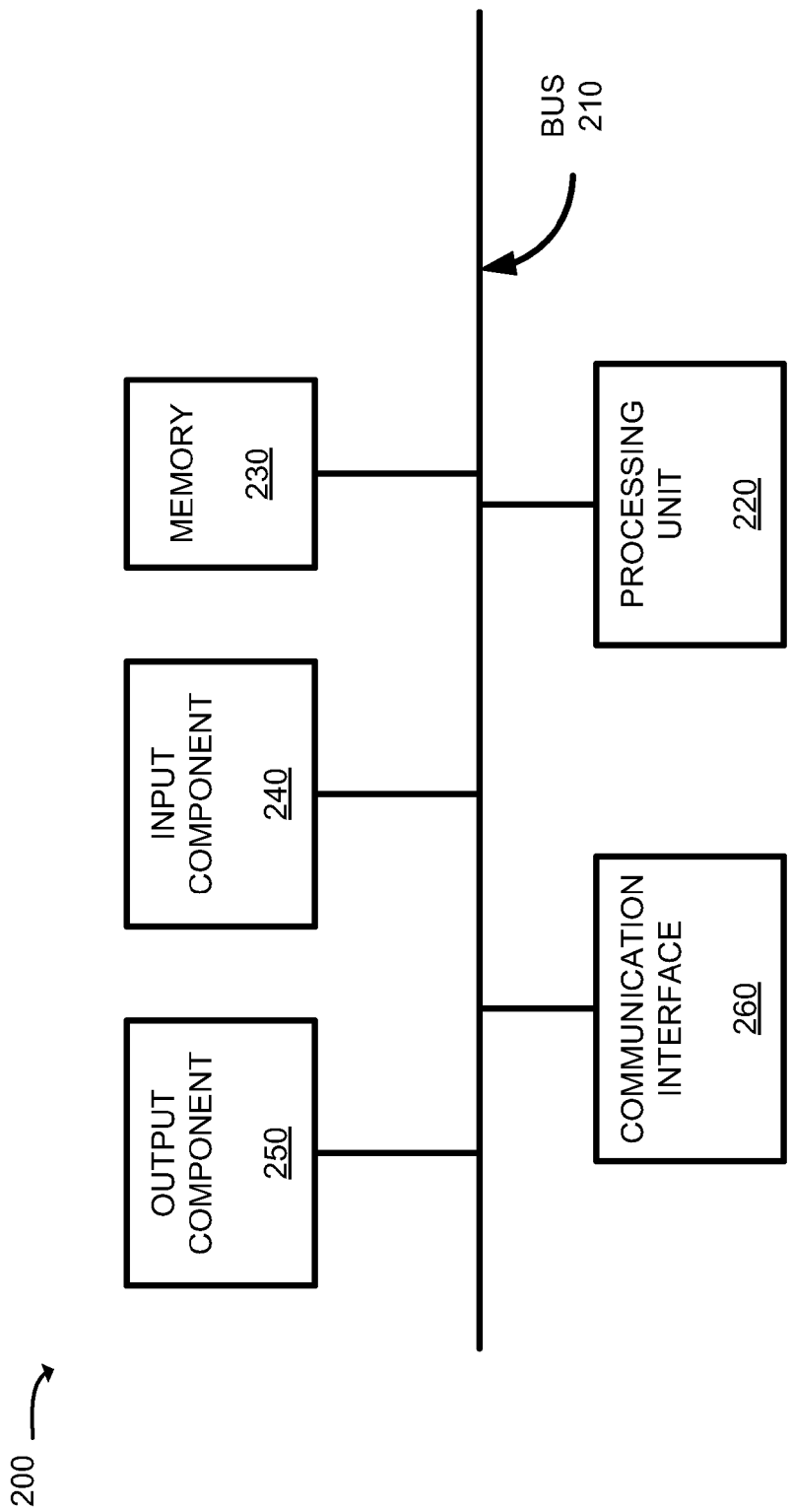
FIG. 2 is a diagram of example components of one or more of the devices of FIGS. 1A and 1B.

FIG. 2 is a diagram of example components of a device 200 that may correspond to mobile device 110, base station 120, MME 132, SGW 134, PCRF 136, PGW/TAS 138, PS 140, OCS 150, DS interface 160, HSS 142, and/or AF/CSCF 144. Each of mobile device 110, base station 120, MME 132, SGW 134, PCRF 136, PGW/TAS 138, PS 140, OCS 150, DS interface 160, HSS 142, and/or AF/CSCF 144 may include one or more of devices 200, and/or one or more components of device 200. As illustrated, device 200 may include bus 210, processing unit 220, memory 230, input component 240, output component 250, and communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, or some other type of magnetic or optical recording medium and its corresponding drive for storing information or instructions.

Input component 240 may include a device that permits an operator to input information to device 200, such as a button, a switch, a keyboard, a keypad, a mouse, a microphone, or the like. Output component 250 may include a device that outputs information to the operator, such as a display, a speaker, a light emitting diode (LED), or the like.

Communication interface 260 may include any transceiver-like mechanism that enables device 200 to communicate with other devices or systems. For example, communication interface 260 may include receiver or transmitter components for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
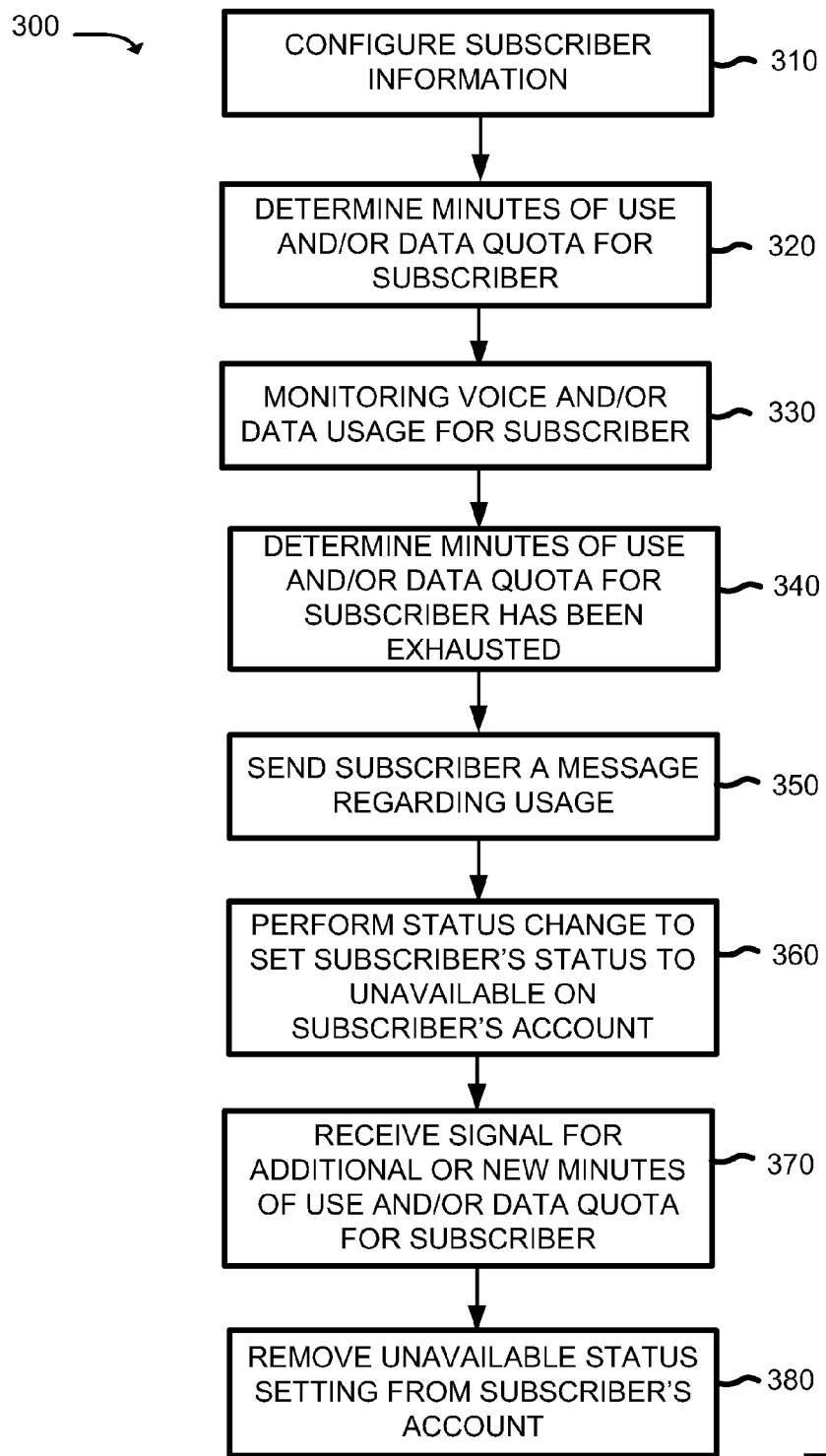
FIG. 3 is a flow chart of an example process according to an implementation described herein.

FIG. 3 is a flow chart of an example process 300 for conserving network resources using DS interface 160. Process 300 may allow for OCS 150 to communicate with PS 140 using DS interface 160, and may allow PS 140 to conserve network resources by changing a subscriber's status based on the communication from OCS 150. In one implementation, DS interface 160 can signal PS 140, from OCS 150, of MoU and/or data quota exhaustion and/or replenishment, such that PS 140 can change the subscriber's availability status (e.g., allow the subscriber to be available or unavailable) based upon the availability of MoU and/or data usage quota for the subscriber (e.g., available or exhausted MoU and/or data usage quota).

Process 300 may include configuring subscriber information (block 310). For example, one or more server devices, such as PCRF 136, may configure the subscriber information. The subscriber information can include information on the subscriber and the subscriber's subscription, such as the type of subscriber (e.g., professional, personal, enterprise, long term customer, new customer, network administrator, etc.) or the type of subscription (e.g., unlimited plan, corporate plan, consumer plan, standard plan, premium plan, etc.).

The subscriber information can be used to adjust policies for specific subscribers based upon their subscriptions to standard and premium services (e.g., QoS guarantees, higher network usage packages, etc.) or other factors that may be subscriber specific (e.g., long term customer, network administration, special customer status, etc.). In one implementation, PCRF 136 can access a subscriber's subscription profile to configure the subscriber's information for use by OCS 150.

In one implementation, the subscriber information can be used to determine whether OCS 150 should send a signal to PS 140 to set the subscriber's status to unavailable. For example, if the subscriber subscribes to premium services or has a special status (e.g., network administrator, corporate customer, etc.), OCS 150 can be instructed to allow unlimited MoU or data usage so as to not interrupt the subscriber's service. As another example, if the subscriber opts to automatically purchase new MoU or data usage whenever the subscriber's quota has been exhausted, then OCS 150 or PS 140 can be instructed to not send the subscriber a message regarding exhaustion and to not interrupt the subscriber's service.

Process 300 may include determining the MoU and/or data quota for the subscriber (block 320). For example, one or more server devices, such as OCS 150 or PCRF 136, may determine the MoU or data quota for the subscriber. In one implementation, OCS 150 can receive subscriber information, such as rate plans, from PCRF 136 and can extract the MoU or data quota information from the subscriber information. For example, OCS 150 can receive a data structure from PCRF 136 that provides a particular rate plan's name or identifier, and OCS 150 can determine the MoU or the data quota permitted for the particular rate plan.

In another implementation, OCS 150 can access the subscription records from a data structure, which can be located within OCS 150 or another server, to determine the voice and data rate plans. For example, OCS 150 can gather subscription records from a data structure for a particular subscriber to determine the MoU or data quota for the particular subscriber.

Process 300 may include monitoring voice and/or data usage for the subscriber (block 330). For example, one or more server devices, such as PGW/TAS 138 may monitor the voice MoU and/or data quota usage for the subscriber. In one implementation, a PGW can monitor a data session and a TAS can monitor voice usage. During a voice call or a data session, PGW/TAS 138 can verify that the subscriber placing a call or using a data session has remaining MoU or data quota for the call or data session. For example, OCS 150 can compare the MoU remaining to the MoU used, as monitored by PGW/TAS 138, to verify MoU availability for the subscriber.

Process 300 may include determining whether the MoU or the data quota for the subscriber has been exhausted (block 340). For example, one or more server devices, such as OCS 150, may determine whether the MoU or the data quota for the subscriber has been exhausted. In one implementation, OCS 150 can gather information from PGW/TAS 138 and can compare the gathered information to the MoU or data quota for the subscriber to determine whether the MoU or data quota for the subscriber has been exhausted.

In one implementation, OCS 150 can gather information from PGW/TAS 138 on an individual voice call/data session basis, and can compare the gathered information to the MoU or data quota for the subscriber. Additionally, or alternatively, OCS 150 can determine the MoU or data quota that has already been used in a billing cycle. For example, OCS 150 can keep an accounting of the MoU and/or data quota used for a subscriber. Additionally, or alternatively, a server device, such as PGW/TAS 138, can keep an accounting of the MoU and/or data quota for the subscriber, and OCS 150 or PGW/TAS 138 can determine whether the MoU or data quota is nearing exhaustion.

In another implementation, OCS 150 can gather information from PGW/TAS 138 on a scheduled basis, such as hourly, daily, or weekly. The information can include the MoU or data quota used by a subscriber and the MoU or data quota in the subscriber's rate plan.

In one implementation, OCS 150 may use the subscriber information to determine that the MoU or the data quota for the subscriber has not been exhausted for the purposes of process 300. For example, if the subscriber subscribes to premium services or has a special status (see block 310), then OCS 150 can determine that the MoU or the data quota of the subscriber has not been exhausted even if the voice call minutes exceed the MoU or the data usage exceeds the data usage quota.

Process 300 may include sending a message to the subscriber regarding MoU or data quota usage for the subscriber (block 350). For example, one or more server devices, such as OCS 150, can send the message to the subscriber. In one implementation, a text message, email, or voice message can be sent to the subscriber regarding usage when a certain amount of the subscriber's MoU or data quota is used. For example, a text message can be sent to a subscriber when 90% or 100% of the subscriber's MoU or data quota is used.

Process 300 may include performing a status change to set the subscriber's status to unavailable on the subscriber's account (block 360). For example, one or more server devices, such as by OCS 150, PS 140, and DS interface 160, may contribute to the PS 140 performing the status change to set the subscriber's status to unavailable on the subscriber's account. In one implementation, OCS 150 can send PS 140 a signal via DS interface 160 to change the subscriber's status to unavailable for voice calls, data usage, or both, and the subscriber's status, if there is remaining MoU or data usage quota, can remain unchanged. For example, if the subscriber exhausted their MoU and has not exhausted their data usage quota, then the subscriber's status for voice calls can be set to unavailable and the subscriber's status for data usage can remain unaffected. As another example, if the subscriber exhausted their data usage quota and has not exhausted their MoU, then the subscriber's status for data usage, such as instant messages, video calls, etc., can be set to unavailable and the subscriber's status for voice calls can remain unaffected (e.g., the subscriber's previously set status can remain in effect).

In one implementation, PS 140 can maintain a status (e.g., available or unavailable for calls or data usage) of a subscriber as specified by the subscriber until PS 140 receives a message requesting that the subscriber's status be changed to unavailable from OCS 150 via DS interface 160. Additionally, or alternatively, PS 140 can allow the subscriber to change their status as long as the subscriber's MoU or data quota has not been exhausted, and can change the subscriber's status upon notification by OCS 150 via DS interface 160.

PS 140 can set the subscriber's status to be unchangeable by the subscriber. In one implementation, the subscriber's status can be unchangeable until OCS 150 sends a message via DS interface 160 indicating that the subscriber's status can be made changeable by PS 140.

In one implementation, when PS 140 sets the subscriber's status to unavailable, PS 140 can conserve network resources by not allowing voice calls or data access to or from the subscriber. Alternatively, PS 140 can allow some voice calls (e.g., to the service provider, to emergency services, to one or more particular contacts, etc.) or allow some data access (e.g., to the service provider's website, email, etc.), which can still conserve network resources.

Process 300 may include receiving a signal indicating new MoU and/or data quota for the subscriber (block 370). For example, one or more server devices, such as OCS 150, can receive the signal for the new MoU or data quota for the subscriber. In one implementation, OCS 150 can receive a signal from PCRF 136 that the subscriber has added new MoU or data quota. For example, a subscriber, who has already used 500 minutes of voice calling in a billing cycle, can increase the MoU in the subscriber's subscription from 500 to 1000 minutes, and PCRF 136 can send a signal to OCS 150 indicating that the subscriber has a new limit for the MoU. As another example, a subscriber can begin a new data plan, and OCS 150 can receive a signal from PCRF 136 to allow data usage by the subscriber.

Process 300 may include removing the unavailable status setting from the subscriber's account (block 380). For example, one or more server devices, such as OCS 150 and PS 140 via DS interface 160, can remove the unavailable status setting on the subscriber's account.

In one implementation, OCS 150 can send a signal to remove the unavailable status setting to PS 140 via DS interface 160, which can allow the subscriber to set the subscriber's status setting. For example, OCS 150 can receive a signal that the subscriber has increased their MoU, and OCS 150 can send a signal to PS 140 via DS interface 160 requesting that the unavailable status setting on the subscriber's account be removed. After the status setting is removed from the subscriber's account, the subscriber can set the subscriber's status to available, can leave the status as unavailable, or can set any the status to any status (e.g., busy, another standard status, or a custom status). Alternatively, PS 140 can automatically set the subscriber's status to available (or another status as can be preset by the subscriber or a system administrator).

Figure 4:
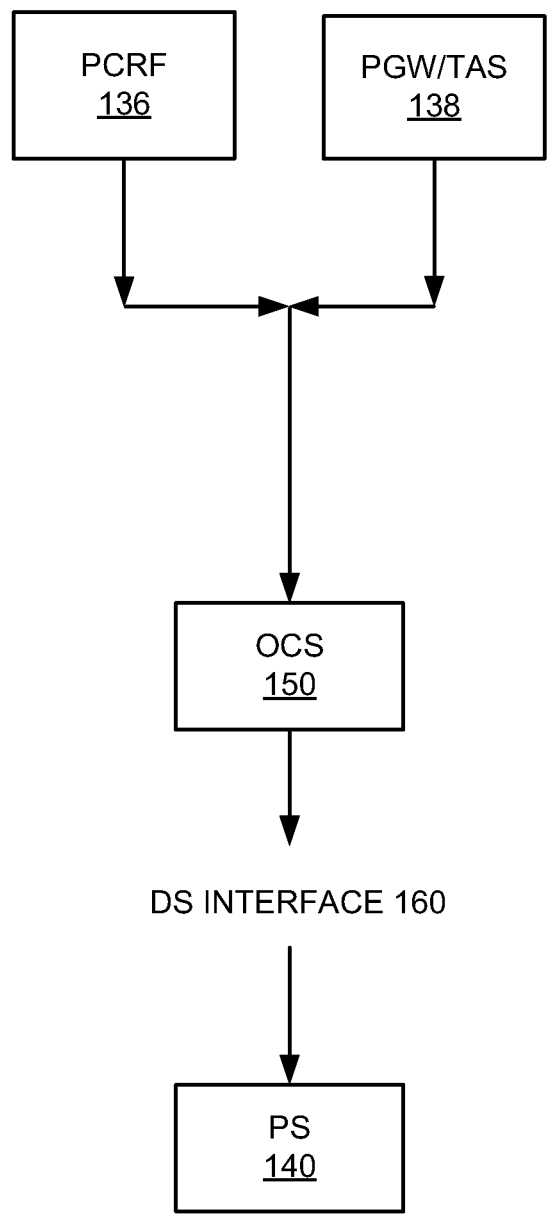
FIG. 4 is a diagram illustrating an example system flowchart for communicating a subscriber's status using an interface according to an implementation described herein.

FIG. 4 is a diagram illustrating an example system flowchart for communicating a subscriber's status using an interface. As illustrated in FIG. 4, PCRF 136 can send a subscriber's information, such as rate plan information, to OCS 150. PGW/TAS 138 can monitor subscriber's usage of the MoU and data quota, and send the subscriber's usage to OCS 150. OCS 150 can use the subscriber's information from PCRF 136 and subscriber's usage from PGW/TAS 138 to determine if the subscriber's MoU or data quota has been exhausted. When the subscriber's MoU or data quota has been exhausted, OCS 150 can send a signal to PS 140 via DS interface 160 indicating that the subscriber's MoU or data quota has been exhausted. After receiving the signal from OCS 150 via DS interface 160, PS 140 can set the subscriber's status to unavailable), and the subscriber's access to services, such as voice calling, data usage, etc. can be limited or terminated.

Similarly, FIG. 4 can be used to communicate a change, replenishment, or addition to the subscriber's MoU or data quota from PCRF 136 and/or PGW/TAS 138 to OCS 150 to PS 140 via DS interface 160, such that PS 140 can remove a status setting of unavailable and allow the subscriber to set their own status.

Figure 5:
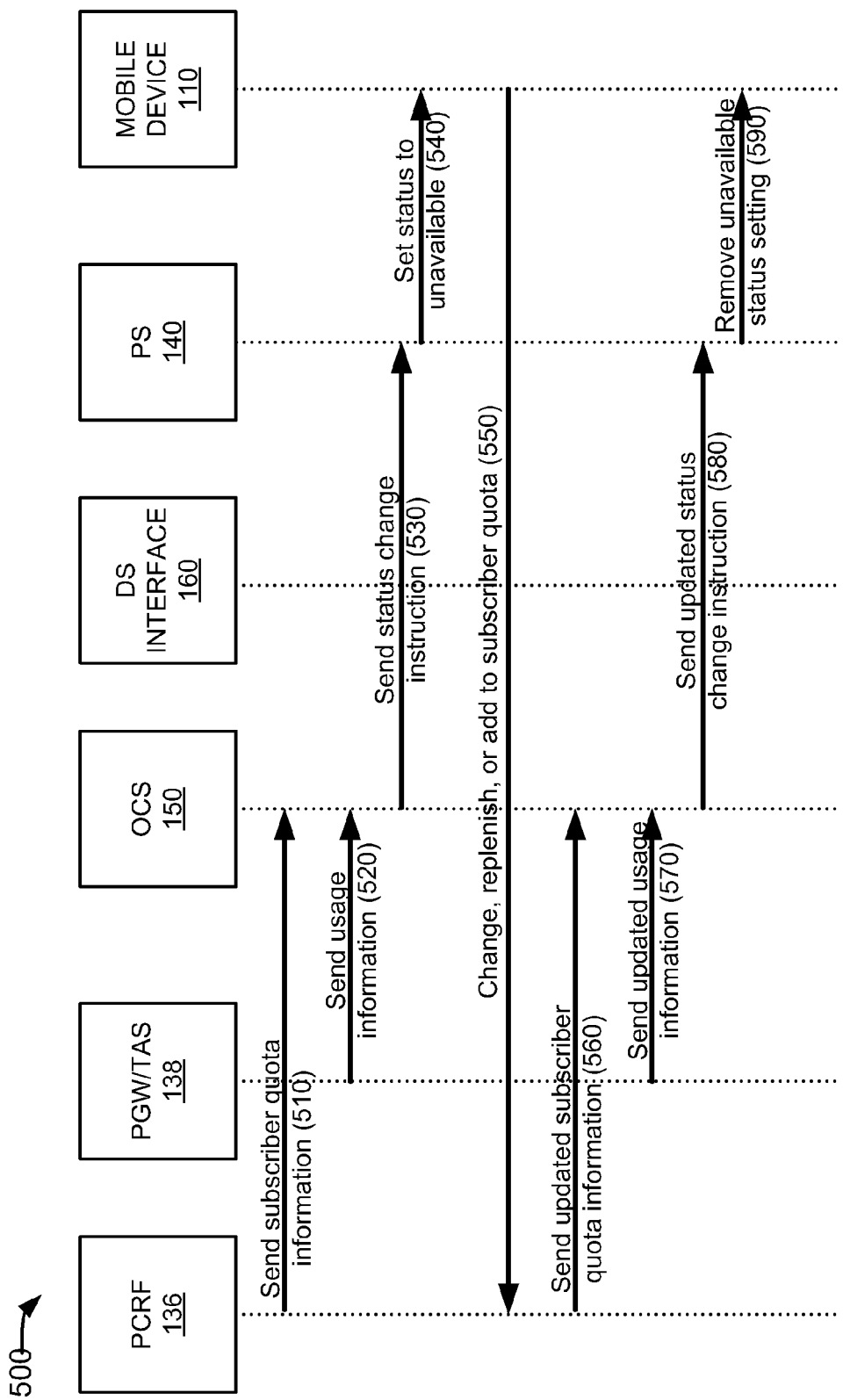
FIG. 5 is a diagram illustrating a signaling diagram between components of FIG. 1B according to an implementation described herein.

FIG. 5 is a diagram illustrating a signaling diagram 500 between components of FIG. 1B. As illustrated in FIG. 5, signaling diagram 500 may include PCRF 140 136, PGW/TAS 138, OCS 150, DS interface 160, PS 140, and mobile device 110.

As further shown in FIG. 5, PCRF 136 can determine a subscriber's quota, and can send a subscriber quota information signal 510 to OCS 150. PGW/TAS 138 can monitor the subscriber's usage, and send a subscriber's usage information signal 520 to OCS 150.

OCS 150 can use the subscriber's information signal 510 from PCRF 136 and the subscriber's usage information signal 520 from PGW/TAS 138 to determine if the subscriber's MoU or data quota has been exhausted. When the subscriber's MoU or data quota has been exhausted, OCS 150 can send a status change instruction signal 530 to PS 140 via DS interface 160 indicating that the subscriber's MoU or data quota has been exhausted. PS 140 can send a set status to unavailable signal 540 to mobile device 110 to limit the subscriber's access to services, such as voice calling, data usage, etc.

Mobile device 110 or the subscriber (not shown) can send a change, replenishment, or addition to the subscriber's MoU or data quota signal 550 via a subscriber accounting server or the like (not shown) to PCRF 136. PCRF 136 can send an updated subscriber quota information signal 560 to OCS 150. PGW/TAS 138 can monitor the subscriber's usage and can send an updated usage information signal 570 to OCS 150.

OCS 150 can use the updated subscriber quota information signal 560 from PCRF 136 and the updated usage information signal 570 from PGW/TAS 138 to determine if the subscriber's has available MoU or data quota. When the subscriber has available MoU or data quota, OCS 150 can send an updated status change instruction signal 580 to PS 140 via DS interface 160 indicating that the subscriber has available MoU or data quota. PS 140 can send a status remove unavailable status signal 590 to mobile device 110 to allow the subscriber to set their own status.

The foregoing description provides illustration and description, but is not intended to be exhaustive or to limit the implementations to the precise form disclosed. Modifications and variations are possible in light of the above disclosure or may be acquired from practice of the implementations.

While a series of blocks has been described with regard to FIG. 3, the order of the blocks may be modified in other implementations. Further, non-dependent blocks may be performed in parallel.

It will be apparent that systems or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims or disclosed in the specification, these combinations are not intended to limit the disclosure of the embodiments. In fact, many of these features may be combined in ways not specifically recited in the claims or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by one or more servers, a voice call minutes quota and/or a data usage quota;
   monitoring, by the one or more servers, voice call minutes relative to the voice call minutes quota and/or data usage relative to the data usage quota;
   determining, by the one or more servers, that the voice call minutes are exhausted when the voice call minutes used meets the voice call minutes quota and/or that the data usage is exhausted when the data usage meets the data usage quota;
   sending, by a first of the one or more servers via a dedicated direct signaling interface, a signal regarding the exhaustion of the voice call minutes quota and/or the data usage quota to a second of the one or more servers; and
   performing, by the second of the one or more servers and based on the signal sent via the dedicated direct signaling interface, a status setting on an account, associated with the subscriber, to indicate that the subscriber is unavailable when the voice call minutes quota and/or the data usage quota has been exhausted.

2. The method of claim 1, further comprising:
   denying voice call service or data service to and from the subscriber when the status setting on the account, associated with the subscriber, indicates that the subscriber is unavailable.

3. The method of claim 2, further comprising:
   notifying other subscribers that the subscriber is not available for voice calls or messages when the status setting on the account, associated with the subscriber, indicates that the subscriber is unavailable.

4. The method of claim 2, further comprising:
   disconnecting an existing voice call or data service by the first of the one or more servers when the status setting on the account, associated with the subscriber, indicates that the subscriber is unavailable.

5. The method of claim 1, further comprising:
   sending, by the first of the one or more servers via the dedicated direct signaling interface, a particular signal regarding a new voice call or data quota being applied to the subscriber's account; and removing, by the second of the one or more servers and based on the particular signal, the subscriber's status setting on the account, associated with the subscriber, that indicated that the subscriber is unavailable.

6. The method of claim 1, where determining the voice call minutes quota comprises sending the voice call minutes quota from a third of the one or more servers to the first of the one or more servers, and where determining the data usage quota comprises sending the data usage quota from the third of the one or more servers to the first of the one or more servers.

7. The method of claim 1, where performing the status setting on the account, associated with the subscriber, indicating that the subscriber is unavailable, occurs in an Internet Protocol (IP) Multimedia System (IMS) system.

8. A system, comprising:
a first server to:
monitor a subscriber's voice call minutes quota and/or data usage quota,
monitor voice call minutes usage and/or data usage to determine when the subscriber's voice call minutes quota or data quota has been exhausted, and
generate a signal indicating that the subscriber's voice call minutes quota or data usage quota has been exhausted;
a second server to:
receive the signal from the direct signaling interface indicating that the subscriber's voice call minutes quota or data usage quota has been exhausted, and
notify another subscriber that the subscriber is as unavailable for receiving voice calls and/or data communications when the subscriber's voice call minutes quota and/or data quota has been exhausted; and
a direct signaling interface, connecting the first server to the second server, to communicate the signal from the first server to the second server.

9. The system of claim 8, further comprising a third server to deny voice or data service to or from a device associated with the subscriber when the subscriber's voice call minutes quota and/or data usage quota has been exhausted.

10. The system of claim 8, where the first server is further to monitor the subscriber's voice call minutes quota and/or data usage quotas to determine when the subscriber's voice call minutes quota and/or data quota has been renewed or supplemented.

11. The system of claim 10, where the direct signaling interface is further to communicate an additional signal that indicates a new voice call minutes quota and/or data usage quota.

12. The system of claim 11, where the second server is further to:
receive the additional signal, from the direct signaling interface, indicating a new voice call minutes quota and/or data quota, and
remove the notification to the other subscriber that the subscriber is unavailable for receiving voice calls and/or data communications.

13. A system comprising:
one or more servers to:
set an availability status setting on an account, associated with a subscriber;
receive a quota usage signal via a dedicated direct signaling interface, the quota usage signal indicating that a voice call minutes quota or a data usage quota is exhausted; and
change the availability status setting on the account to unavailable for voice calls if the voice call minutes quota is exhausted; and/or
change the availability status setting on the account to unavailable for data communications if the data usage quota is exhausted.

14. The system of claim 13, where the one or more servers is further to:
deny a voice call service to or from the subscriber when the availability status setting on the account is set to unavailable for voice calls; and/or
deny a video call service or a data communication to or from the subscriber when the availability status setting on the account is set to unavailable for data usage.

15. The system of claim 13, where the one or more servers is further to:
notify another subscriber that the subscriber is not available for voice calls when the availability status setting on the account is set to unavailable for voice calls; and/or
notify another subscriber that the subscriber is not available for video calls or data communications when the availability status setting on the account is set to unavailable for video calls and data communications.

16. The system of claim 13, where the one or more servers is further to:
disconnect an existing voice call when the availability status setting on the account is set to unavailable for voice calls; and/or
disconnect an existing video call or data communication when the availability status setting on the account is set to unavailable for data communications.

17. The system of claim 13, where the one or more servers is further to:
receive a new quota signal via the dedicated direct signaling interface, the new quota signal indicating a new voice call minutes quota and/or data usage quota; and
remove the availability status setting on the account of unavailable for voice calls when the new quota signal indicates the new voice call minutes quota; and/or
remove the availability status setting on the account of unavailable for data communications when the new quota signal indicates the new data usage quota.

18. The system of claim 13, where the one or more servers includes:
a first server to send a quota signal with the voice call minutes quota or the data usage quota;
a second server to send a usage information signal with voice call minutes usage information or data usage information;
a third server to receive the quota signal from the first server and the usage information signal from the second server, and to send the quota usage signal based on the voice call minutes quota and the voice call minutes usage information, or the data usage quota and the data usage information; and
a fourth server to receive the quota usage signal from the third server via the dedicated direct signaling interface and to change the availability status setting on the account to unavailable for voice calls if the voice call minutes quota is exhausted and/or change the availability status setting on the account to unavailable for data usage if the data usage quota is exhausted.

19. The system of claim 18, where the first server is further to send a new quota signal with a new voice call quota or a new data usage quota,
where the third server is further to send a new quota usage signal based on the new quota signal from the first server, where the fourth server is further to receive the new quota usage signal from the third server, where the fourth server is further to remove the availability status setting on the account of unavailable from the account based upon the new quota usage signal, and where the fourth server is further to set the availability status setting on the account to the availability status setting that existed before the availability status was changed to unavailable.

20. The system of claim 13, where the system is an Internet Protocol (IP) Multimedia System (IMS) system.

* * * * *